Patented Dec. 23, 1952

2,623,021

UNITED STATES PATENT OFFICE 2,623,021

FORMATION OF AN ATTRITION-RESISTANT FISCHER-TROPSCH CATALYST

Sumner B. Sweetser, Cranford, Francis R. Russell, Scotch Plains, and Edward R. Bucker, Roselle, N. J., assignors to Standard Oil Development Company, a corporation of Delaware No Drawing. Application September 2, 1948, Serial No. 47,548

7 Claims. (Cl. 252—474)

The present invention relates to the catalytic conversion of carbon oxides with hydrogen to form valuable hydrocarbons and oxygenated organic products. The invention relates more particularly to improved catalysts for this synthesis employing the fluid solids technique, and particularly to a sintered iron catalyst which is particularly effective, resistant to fouling by carbon formation and resistant to disintegration.

It is known that mixtures of carbon monoxide and hydrogen when brought into intimate contact with catalysts under suitable conditions of temperature and pressure are converted into hydrocarbons and oxygenated organic compounds, producing valuable unsaturated liquid hydrocarbons in the gasoline range having high octane ratings. The catalytic conversion of carbon monoxide and hydrogen can be carried out in fixed bed, slurry, or fluid solids type of operation. The advantages of the latter, such as improved heat distribution, transfer, and control, and of intimate mixing and contact of the catalyst with the reactants are well known. Two problems that arise particularly in conjunction with the fluid solids type of operation are the fouling and consequent inactivation of the catalyst by carbon deposition and the tendency of the catalyst particles to disintegrate, presumably because of carbon formation and deposition within the lattice of the catalyst particles.

One of the most satisfactory means of overcoming the tendency of an iron synthesis catalyst to disintegrate has been to sinter the latter in the presence of a non-oxidizing or even reducing atmosphere. This sintering operation was first suggested by Michael (U. S. 2,183,146 and U. S. 2,254,748) at a time before the fluid solids technique had been applied to the hydrocarbon synthesis process.

With the introduction of the fluid technique to the hydrocarbon synthesis reaction, several problems in the application of sintered catalysts to this improved process are apparent. First and foremost is the problem of grinding the sintered catalyst to fluidizable size. In the fixed bed process of Michael, it was sufficient to pill the catalyst before sintering to suitable pea size and then sinter, the agglomerating effect of the sintering being to give an extremely hard body which may be used as such in the fixed bed process with or without prior promoter addition. In the fluid solids process, however, the catalyst particles must be of an average size so that the resultant catalyst mass is fluidizable under the reaction conditions obtaining in the hydrocarbon synthesis reactor. Under normal reaction conditions, an average fluidizable particle distribution of the catalyst would be the following:

| Mesh: | Per cent |
|---|---|
| Up to 100 | 0 |
| 100–200 | 40 |
| 200–270 | 20 |
| 270–325 | 20 |
| Through 325 | 20 |

In order to obtain sintered iron catalyst particles of a size suitable for fluidization, that is, in the range 100 to 325 mesh, previous practice has been to impregnate an active catalytic material, such as red iron oxide, with a solution of a desired promoter, such as alkali metal salts, to form a paste which is dried, broken up into 10–20 mesh granules, pilled, and sintered at a temperature of about 1400° to 1600° F. in an atmosphere of hydrogen. In this manner pills were obtained which were metallic in appearance, and while they usually showed good catalytic activity they were found to be exceedingly difficult to grind to a particle size suitable for fluid operation. Thus by this method of sintering pills, only about a 5–10% yield of material which passes through an 80 mesh screen was obtained by putting the sintered pills through a planetary disc grinder 25 times, the sintered product being hydrogen-reduced promoted red iron oxide.

It is the purpose of this invention to disclose a new and advantageous method whereby sintered reduced red iron oxide catalyst of a particle size suitable for fluidization may be readily prepared in a state requiring only a simplified subsequent grinding process, or the final grinding step may be substantially eliminated, thus greatly saving on the time, labor, and equipment required for the hydrocarbon synthesis process.

Another object of the invention is to disclose a process of producing a sintered reduced red iron oxide catalyst which requires substantially no grinding after sintering, and whose promoter content may be controlled during the sintering operation.

A more specific object of the invention is to provide a simplified process for making an improved hydrocarbon synthesis catalyst for use in the fluid catalyst hydrocarbon synthesis from carbon monoxide and hydrogen.

Other objectives and advantages of the invention will become apparent hereinafter.

It has now been found that the grinding operation can be greatly simplified and substantially eliminated when the catalyst is sintered in the form of small granules rather than in the form of pills, as practiced heretofore. The size of the granules is selected so that the shrinkage accompanying the "incipient fusion" of the promoted red iron oxide on sintering gives a product which after granulating or light grinding to break apart the individual particles has approximately the desired size for good fluidization. Depending upon the particle size desired for the fluid operation the dried material prior to sintering may be broken up into granules from 60–80 mesh, 60–100 mesh or, to obtain a wider range of particle size, all material passing through a 40 or 60 mesh screen may be used for the sintering operation. Thus whereas by the previous method of sintering pills only about a 5–10% yield of catalyst passing through an 80 mesh screen was obtained by putting the pills through a planetary disc grinder 25 times, by the process of the present invention whereby granules passing through a 40 mesh screen are employed in the sintering operation, a product comprising a 50% yield of catalyst passing through an 80 mesh screen was obtained when the sintered catalyst was put through the grinder only five times. Thus a tenfold increase in fluidized catalyst yield was accompanied by a fivefold decrease in grinding requirements.

Red iron oxide catalyst is generally prepared for use in the hydrocarbon synthesis reaction by steps comprising precipitating the hydroxide from solution, washing, filtration, drying, impregnation of the iron compound with the desired promoter, such as $K_2CO_3$ or $KF$ to give a product which, on drying at approximately 200–400° F. may contain about 1–3% of the promoter. In accordance with the present invention, the dried impregnated red iron oxide is first pilled and then broken up into particles of such size that all pass through a number 40 mesh screen. The dried and screened product may then be charged to a suitable reducing apparatus, air removed by flushing with an inert gas, and then a reducing gas such as hydrogen is passed through the promoted red iron oxide bed at a relatively high flow rate of 750–1500 v./v./hr. (v./v./hr.=volume of gas per hour per volume of red iron oxide bed), the reduction being carried out at temperatures between 900°–1100° F., preferably at the higher range, and the flow of gas continued until no further reduction takes place.

The latter portion of the sintering step, as described more fully below, is advantageously carried out under very low hydrogen throughput rates, in particular when high sintering temperatures in the range of 1400°–1650° F. are used. It has now been found that the customary method of hydrogen sintering in which the temperature is raised from the hydrogenation to the sintering range, but the rate of hydrogen throughput remains substantially the same for the whole of the sintering treatment, a large proportion of the promoter on the catalyst is volatilized and causes plugging of vent lines in the cooling section of the furnace, and the composition and proportion of promoter on the catalyst is difficult to control. The inventors have found that this difficulty is largely eliminated by reducing the flow during the latter portion of the sintering period to a very low rate of about 100–200 v./v./hr., the purpose of the slow sweep being merely to insure that no air gets into the furnace. However, in order to obtain an iron catalyst containing less than about 1% oxygen content it is important, during the initial stages of the sintering processes, to maintain hydrogen throughputs of substantially the same order of magnitude as during the reduction step proper for it has been found that reduction of this type of catalyst is not complete even after treatment with hydrogen at 1100° F. for from 3 to 6 hours.

Following the hydrogenation step, therefore, the temperature in the furnace may be raised to the desired sintering range, 1250°–1400° F. when the requirements are for low temperature sintering, 1400°–1650° F. when the requirements are for a high-temperature sintered product. The promoted reduced catalyst may be maintained at the sintering temperature for about 1 hour at the high flow velocity of 750–1500 v./v./hr., then for about 2–4 hours at a low hydrogen flow of about 100–200 v./v./hr. The material may then be cooled in an inert gas or hydrogen to room temperature. If sintering has been carried out at a temperature range of about 1250°–1400° F., substantially no grinding of the sintered catalyst will be required for use in the fluid solids unit. If a high temperature sintering operation was employed, only a light grinding operation is required. The time during which the catalyst may be exposed to reduction temperatures is a function of the hydrogen flow rate. Thus at a temperature of 1100° F. and a flow rate of 1500 v./v./hr., the residence time of the catalyst in the reducing period may be 4 hours. On the other hand if the flow rate is reduced to about 1000 v./v./hr., the reduction period is increased to about 6 hours. In general, high space velocities can be compensated by decreased reduction time and if the operation is carried out at the lower space velocities the contact time is increased.

The invention may be further illustrated by the following specific examples.

EXAMPLE I

*(Preparation of catalyst)*

A sixty pound batch of the dried impregnated material prepared as described above was fragmented into granules of a size small enough to pass through a #10 mesh sieve, and the product is classified by a #20 mesh sieve. The material retained by the #20 mesh sieve and that which passed through said sieve were then separately made into pills about ⅜″ in diameter in a pilling machine. It was advantageous to add a pilling compound, such as "Sterotex" wax, to the classified portions before pilling. The pills thus formed were then fragmented through a series of sieves until all the material passed through a #40 mesh sieve. This method of preparation of red iron oxide promoted catalyst for sintering substantially avoids the plugging encountered in the smaller sieves when the dried impregnated material is broken successively through a series of sieves until all the material passes through a #40 mesh sieve, thus saving substantially on time and labor.

The dried and classified granulated product was then charged to a closed tube fitted with inlet and outlet connections for gases. The material was flushed with nitrogen to remove air and then hydrogen was introduced. The entire tube was heated by means of a furnace to about 1100° F. and then held at that temperature for about 4 hours while hydrogen was passed through the bed of catalyst at the rate of about 1500 v./v./hr. The temperature was then raised to about 1500° F. while under hydrogen, and the system was maintained at that temperature for 1 hour with the same hydrogen flow, then the flow was decreased to a low hydrogen flow rate of 200 v./v./hr. and maintained under these conditions for 3 hours.

The catalyst was then cooled under nitrogen to room temperature and discharged into air and given a light grinding. The sintered mass was given a final classification by shaking through an 80 mesh screen. The product thus obtained was of a size desirable for good fluidization, with particle distribution as follows:

| | Per cent |
|---|---|
| Through 100 mesh | 71.0 |
| Through 80 on 100 | 9.0 |
| On 80 | 14.4 |
| Fines | 5.6 |

The bulk density of the final production was 2.2 to 2.3 as against the density of the unsintered material which was 1.1 to 1.2. This increase in bulk density is a measure of the decrease in the particle size resulting from the sintering operation. This decrease in particle size is important in the fluid catalytic technique.

To indicate the superior anti-fouling and disintegration resisting properties of a reduced alkali metal promoted iron oxide catalyst classified and sintered in accordance with the present invention, the following data are given from a fluid catalyst hydrocarbon synthesis pilot plant run.

CATALYST ACTIVITY

| | |
|---|---|
| Catalyst | $A^1$ |
| Temperature °F | 650–695 |
| Pressure p. s. i. g | 400 |
| Feed gas ratio, $H_2$/CO | 1.1 |
| Feed gas throughput rate (std. cu. ft. per hr. $H_2$+CO per lb. catalyst) | 12 |
| Duration of run hours | 451 |
| Per cent conversion, $H_2$+CO per cent | 65–95 |
| Product oil, cc./m.$^3$ converted $H_2$+CO cc | 172–191 |
| Disintegration rate$^2$ | 8 |
| Carbon formation rate$^3$ | 4 |

$^1$ Prepared as described above.
$^2$ Grams of 0–20 micron material formed per 100 grams of 20+ microns present per 100 hours.
$^3$ Grams of carbon formed per 100 grams catalyst per 100 hours.

Thus the reduced and sintered alkali promoted red iron oxide catalyst as prepared in accordance with the invention combines the highest activity and liquid product selectivity with very low carbon forming tendencies and high resistance to attrition and disintegration.

In contrast to the catalyst obtained from ordinary sintering operations in which the high rate of hydrogen throughput is not decreased following the catalyst reduction step and wherein the promoter loss is high, the promoter loss when sintering is carried out in accordance with the present invention is very small. Thus when a red iron oxide catalyst containing 1.5% $K_2CO_3$ prior to sintering is prepared and then sintered at 1570° F., the promoter loss after 4 hours sintering at the customary hydrogen throughput rate specifically 500 v./v./hr. at 15 p. s. i. a., was 65%. When sintering was carried out in accordance with the present invention, this loss was reduced to 7%, almost a tenfold decrease.

The foregoing description and examples, though illustrating specific applications and results of the invention, are not intended to exclude other modifications obvious to those skilled in the art, and which are within the scope of the invention.

What is claimed is:

1. A process for producing an attrition resistant catalyst for the conversion of carbon monoxide and hydrogen into normally liquid hydrocarbons and oxygenated organic compounds from a previously unsintered iron oxide of low mechanical strength which comprises impregnating with an alkali metal salt promoter a red iron oxide powder prepared by precipitating an iron compound from an aqueous solution of an iron compound and heating the said precipitate to convert it to the oxide, drying the impregnated material, pilling the latter, granulating said pills to a size such that all of the material passes through a 40 mesh screen, passing a stream of hydrogen through a bed of the granulated material to reduce the iron oxide, raising the temperature of the bed after said reduction to a temperature within the sintering range of from about 1250°–1600° F., continuing the heating in the said sintering temperature range while continuing to pass hydrogen through the said catalyst bed during a period of from about 3 to 5 hours, the hydrogen rate of flow through the said bed being from about 750 to 1500 v./v./hr. during an initial minor portion of the sintering period wherein the iron is reduced to the extent that it contains below 1% $O_2$ and at a flow rate of from about 100 to 200 v./v./hr. during the remainder of the sintering period, cooling the heated product and recovering a fluid solid hydrocarbon synthesis catalyst requiring substantially no grinding.

2. The method set forth in claim 1 in which the pills are granulated to a size of from 40–60 mesh.

3. The method set forth in claim 1 in which the granulated material is treated with hydrogen in the sintering range for a period of about 1 hour at a feed rate of from 750–1500 v./v./hr. and at a feed rate of from 100–200 v./v./hr. during a period of 3 hours.

4. The process of claim 1 in which the iron oxide reduction is carried out at a temperature of from about 900° to about 1100° F.

5. The process of claim 1 in which the dried alkali metal salt impregnated material is broken into fragments substantially all passing through a #10 mesh sieve, some fragments passing through a #20 mesh sieve and the balance retained by said sieve, pilling separately said retained and unretained portions, and breaking said pills through a series of sieves until substantially all of the material passes through a #40 mesh sieve.

6. The process of claim 1 in which said promoter comprises about 0.5–5% by weight of potassium carbonate.

7. The process of claim 1 wherein the granulated material is maintained at non-sintering reduction conditions for a period of from about 4 to 6 hours and at sintering conditions for about 3 to 5 hours.

SUMNER B. SWEETSER.
FRANCIS R. RUSSELL.
EDWARD R. BUCKER.

REFERENCES CITED

The following references are of record in the file of this patent:

UNITED STATES PATENTS

| Number | Name | Date |
|---|---|---|
| 2,183,145 | Michael | Dec. 12, 1939 |
| 2,183,146 | Michael | Dec. 12, 1939 |
| 2,211,022 | Michael et al. | Aug. 13, 1940 |
| 2,220,261 | Michael et al. | Nov. 5, 1940 |
| 2,254,748 | Michael et al. | Sept. 2, 1941 |
| 2,254,806 | Michael et al. | Sept. 2, 1941 |
| 2,365,094 | Michael et al. | Dec. 12, 1944 |
| 2,461,570 | Roberts | Feb. 15, 1949 |
| 2,471,130 | Vesterdal | May 24, 1949 |
| 2,485,945 | Walker | Oct. 25, 1949 |
| 2,500,331 | Voorhees | Mar. 14, 1950 |